UNITED STATES PATENT OFFICE.

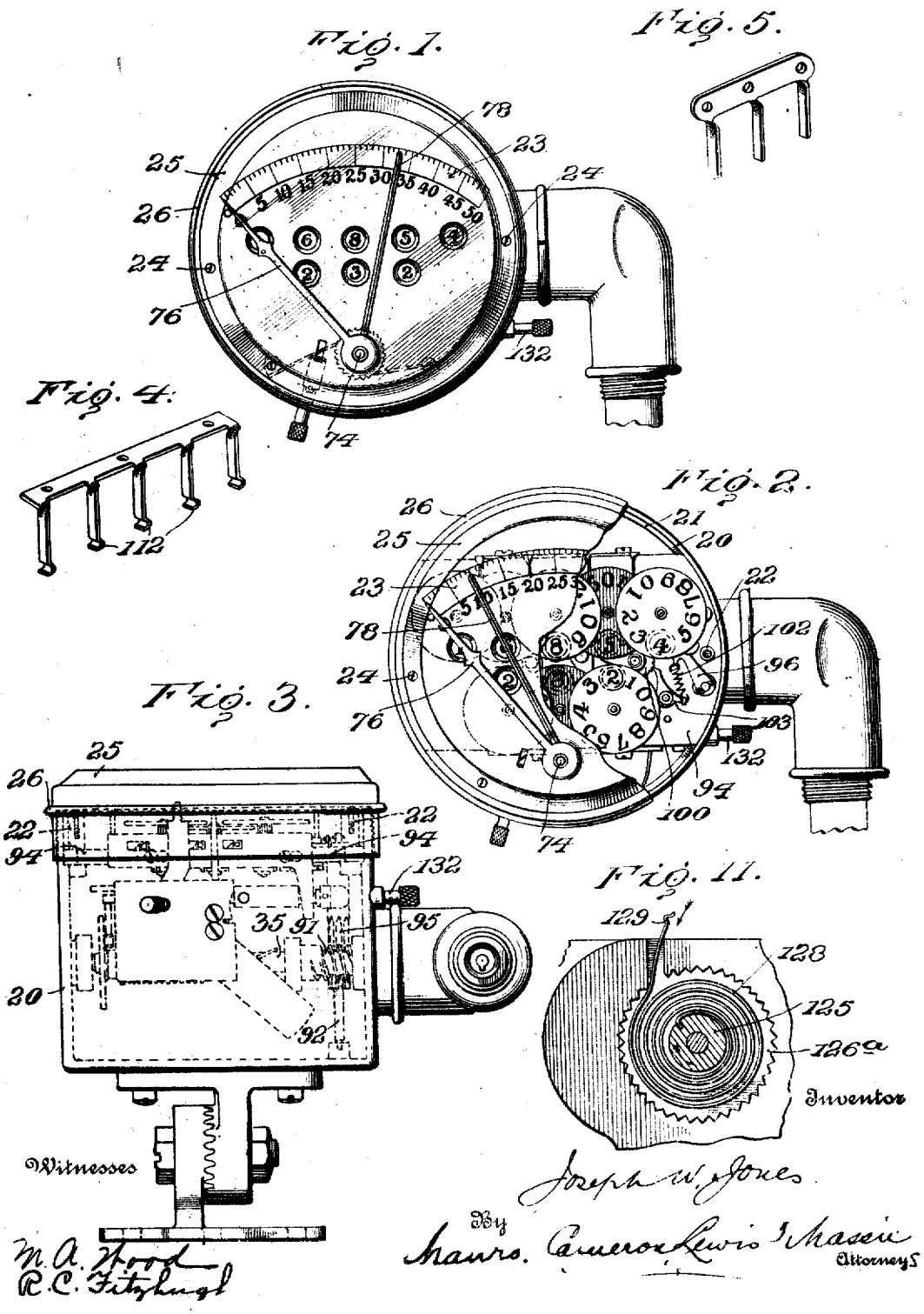

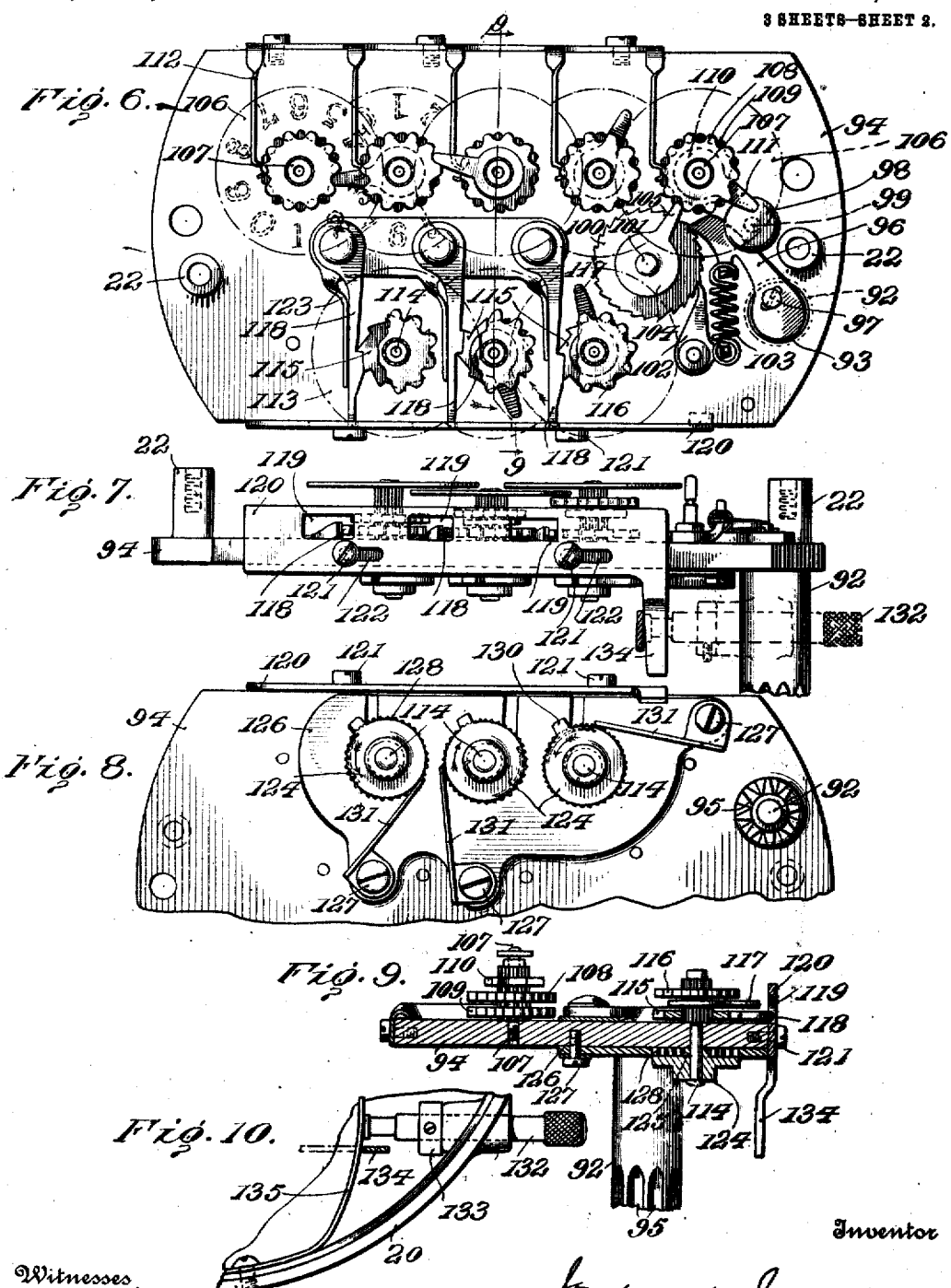

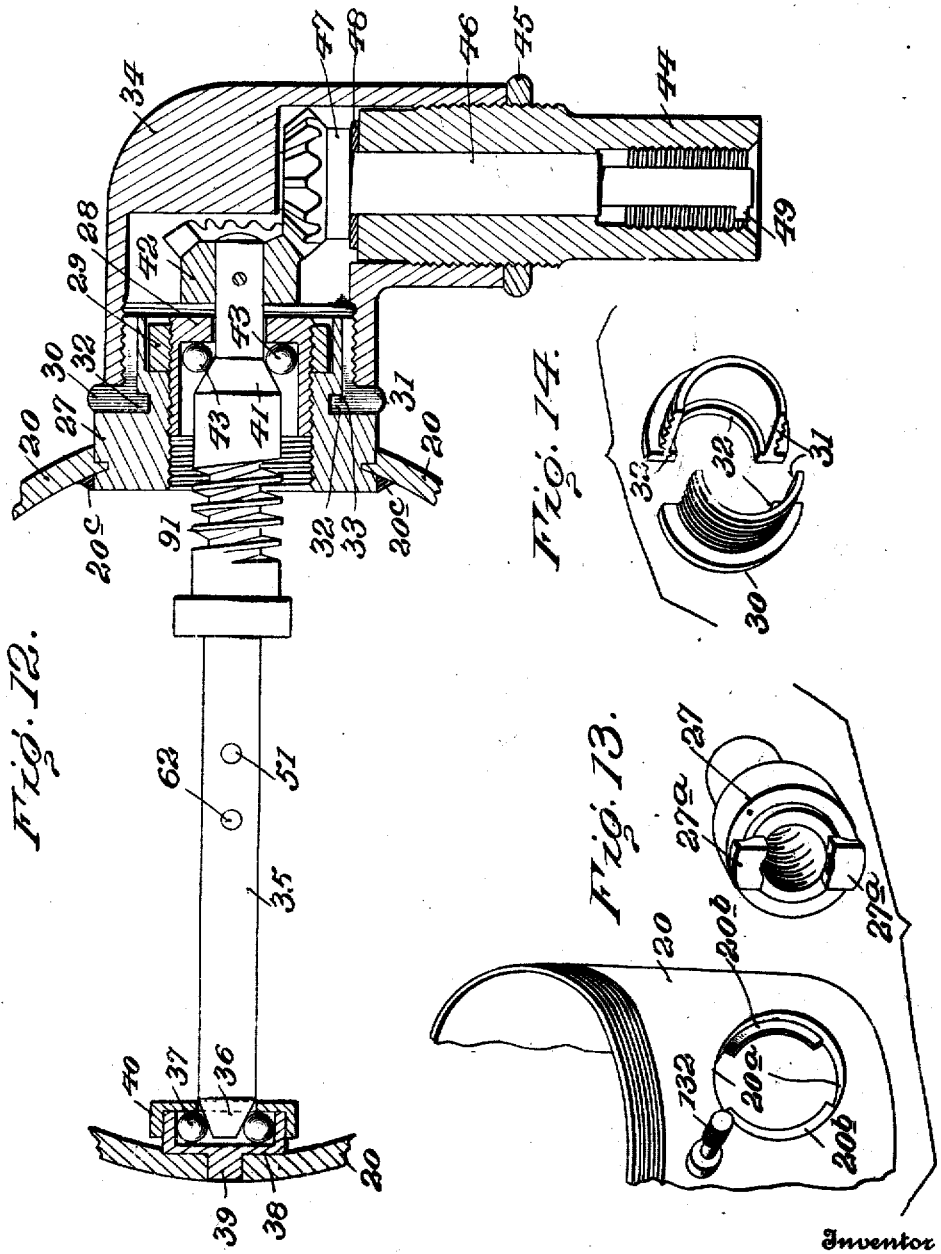

JOSEPH W. JONES, OF NEW YORK, N. Y.

ODOMETER.

1,005,845.  Specification of Letters Patent.  Patented Oct. 17, 1911.

Original application filed August 7, 1908, Serial No. 447,447. Divided and this application filed October 4, 1909. Serial No. 520,948.

*To all whom it may concern:*

Be it known that I, JOSEPH W. JONES, of New York, N. Y., have invented a new and useful Improvement in Odometers, which invention is fully set forth in the following specification.

This is a division of my application filed August 7th, 1908, Serial No. 447,447.

My invention relates to apparatus for indicating speed and distance traveled, and particularly to apparatus for use on automobiles known as "speedometer-odometers," wherein speedometer mechanism for measuring and indicating speed, and odometer mechanism for measuring and indicating distance traveled, are combined in one and the same instrument. The improvements constituting the invention set forth herein relate particularly to the odometer mechanism, and can be best explained in conjunction with the accompanying drawings illustrating what I now believe to be the preferred embodiment thereof.

Figure 1 is a face elevation of the complete apparatus; Fig. 2 is a similar view with part of the cover and dial plate broken away to illustrate the relative positioning of the overlapping numeral disks; Fig. 3 is an elevation of the complete apparatus looking upward in Fig. 1, and showing in dotted outline some of the parts within the casing to illustrate the relative location of the speedometer mechanism and the odometer mechanism; Figs. 4 and 5 are detail views of springs forming part of the mechanism; Fig. 6 is a plan view of the odometer mechanism removed from the casing; Fig. 7 is an edge view of the same; Fig. 8 is an elevation of part of the same mechanism from the underside of Fig. 6; Fig. 9 is a transverse section on line 9—9 of Fig. 6; Fig. 10 is a detail view of the plunger for returning the numeral disks to their zero positions, its restoring spring and neighboring portion of the casing; and Fig. 11 is a detail of part of the mechanism shown in Fig. 8. Fig. 12 is a sectional view illustrating particularly an elbow on the casing and the driving connections extending through the same; Fig. 13 illustrates one method of joining to the casing the connection through which the main shaft of the mechanism extends, and to which the tubular elbow inclosing the beveled gears is joined; Fig. 14 is a detail perspective of a two-part ring which forms a part of the connection between the elbow and the casing.

A few words of general explanation will facilitate an understanding of the more detailed description to follow.

The speedometer mechanism, located principally in the lower part of the cup-casing, beneath the plate 94, Figs. 2 and 3, which extends across the open end of the casing, includes an upright shaft or spindle 74 which is rotated to move an index hand or pointer 76 over a graduated dial on the dial plate 23, the position of this index hand with reference to the figures on the dial indicating the speed being measured. A maximum hand 78 is provided adapted to be retained in position to indicate the highest speed attained. The odometer mechanism, mounted principally upon the plate 94, is geared to and driven from the main or governor shaft 35 (dotted lines Fig. 3) of the speedometer mechanism, and includes two series of numeral disks; the upper series, shown in the drawings as comprising five disks, is driven to indicate the number of miles traveled by a motor vehicle, say for example, during an extended period, or covering a number of trips. One number on each of these five numeral disks is displayed through a correspondingly positioned one of an upper series of five display openings through the dial plate. The lower series of numeral disks comprises, as shown in the drawings, three disks intended to indicate the number of miles traveled during a limited period, or say, during a single trip. Means are provided for readily and instantaneously returning these three disks to their zero position without interfering with the positions of the five disks of the upper series. One numeral on each of the three disks in the lower series is displayed through a corresponding one of three display openings through the dial plate.

Coming now to a detailed description, 20 is a circular cup-like inclosing casing having an offset or shoulder 21, Fig. 2, extending entirely around the inner surface of its wall just below the open end of the casing. The plate 94, heretofore mentioned, rests at its opposite ends on this shoulder and is firmly secured to the casing by suitably placed screws, not shown.

22, 22, are short posts at opposite ends of plate 94 for supporting the circular dial plate 23, screws 24, 24, passing through the said dial plate into screw-threaded openings in said posts.

25 is a glass cover having a beveled edge and secured in an annular frame 26, which latter has an interior screw thread adapted to engage an exterior thread about the open end of the casing.

The odometer mechanism comprises parts which will now be more particularly described.

91, Fig. 3, is a worm on the main shaft 35, preferably turned into an enlarged part cast integral with said shaft.

92 is an upright shaft, the upper reduced end of which projects into an opening 93 (Fig. 6) through the plate 94, heretofore referred to; the lower end of shaft 92 is journaled to rotate in a seat (dotted lines, Fig. 3) on the bottom wall of the casing. Said shaft has about its periphery longitudinally extending elongated teeth 95 constituting a worm gear in engagement with the worm 91, whereby the shaft 93 is rotated from the main shaft. A driving pawl 96 is pivoted on a pin or stud 97 eccentrically disposed on the upper end of shaft 92. The free end of pawl 96 works under and is held in place by the large flat head 98 of a pin 99.

100 is a ratchet wheel rotatable on a stud 101 fixed to plate 94 and adapted by the action of the pawl 96 to be advanced a distance of one tooth for each rotation of shaft 92.

102 is a retaining pawl; a spring 103 connecting lugs on both pawls 96 and 102 serves to hold both of them in engagement with the ratchet wheel.

104 is a disk secured to turn with ratchet wheel 100 and having thereon a finger 105, which in accordance with the arrangement of numbers on the disks as particularly illustrated in the drawings herein, is adapted to make one complete rotation for every tenth of a mile traveled, for example, by an automobile to which the device is applied. This finger 105 is adapted to drive not only the upper series of five numeral disks, but also drives the lower series of three disks independently of the other numeral disks. Each of the upper series of five numeral disks 106 is mounted to turn upon a corresponding stud 107 fixed at its lower end in the plate 94. Each disk has fixed to turn therewith an upper toothed wheel 108, a lower toothed wheel 109, and (with the exception of the disk at the left, Fig. 6) a disk 110 having an actuating finger 1. The teeth of all the wheels have rounded edges as clearly illustrated in Fig. 6. A spring retaining pawl 112 is provided for each of the toothed wheels 109, and by engagement therewith firmly holds the parts in any position to which they are moved, preventing vibration of the vehicle from rotating the disks and giving false indications, and also preventing the carrying mechanism from effecting an overthrow of any particular disk and in this manner giving a false indication. As illustrated in Fig. 6, and more particularly in Fig. 4, the five spring-retaining pawls 112 are preferably formed in one piece, as by stamping and bending from a single sheet of suitable spring metal, phosphor bronze, for example. In this manner all of the five spring pawls are connected together in one piece, affording great facility in assembling mechanism of this character, and enabling all of the springs to be secured in position by a relatively small number of screws. The finger 105 acts upon the teeth of the wheel 108 of the first disk 106 to advance the latter one tooth say for every tenth mile. There being ten teeth on this wheel 108, a complete revolution of the latter will cause its corresponding finger 111 to engage a tooth of the wheel 108 of the second or units disk and advance the latter one step to carry tens thereto. This operation will be repeated as to the parts associated with the disks of the tens, hundreds and thousands. Each of the three numeral disks 113 of the lower series is secured to the upper end of a short shaft 114 journaled to turn in an opening through the plate 94. Above the plate each of these shafts carries fixed to rotate therewith a ratchet wheel 115, a wheel 116 having rounded teeth, and (with the exception of the shaft at the left, Fig. 6) a disk having a finger 117. Each of the ratchet wheels 115 is engaged by a corresponding spring actuated pawl 118, the outer end of each pawl projecting into a corresponding slot 119 in a longitudinally slidable plate 120. Screws 121, 121, passing through slots 122, 122, in the plate 120 and into the plate 94, provide for longitudinal movement of the plate 120 against the tension of pawl actuating springs 123 which constantly tend to press the pawls 118 into engagement with their ratchet wheels. As illustrated in the drawings, the three springs 123 for thus acting upon these pawls are preferably formed from a single sheet of suitable metal, by stamping and bending in the manner illustrated in Fig. 5.

On the under side of the plate 94 each of the shafts 114 has secured thereon a circular disk 124 having a reduced hub 125 which bears against the under side of the plate 94 (Fig. 9) and occupies a position in a circular chamber or opening 126ª through a plate 126, which latter is secured by three screws 127 to the under side of plate 94. The inner end of a thin flat spring 128 (Figs. 12 and 13, partly shown in dotted lines Fig. 11) is anchored to the hub 125, as clearly shown in Fig. 11, and is wound around said hub as a drum, the outer end of said spring being bent to form a tooth 129 which is adapted to engage one of a succession of teeth formed about the inner edge of the circular opening 126ª through the plate 126. When the spring 128 becomes tightly wound, and its corresponding numeral disk 113 continues to be rotated, the tooth 129 at the outer end of the spring will advance its engagement to successive teeth. This will permit repeated and endless rotation of the numeral disks while always maintaining the spring under sufficient tension, and its outer end sufficiently anchored by engagement of its tooth 129 with one of the teeth of the opening 126ª, to permit said spring to rotate its corresponding disk in a reverse direction in returning it to zero. The direction of rotation of the disks 124 at the lower end of the shafts 114, when the numeral disks are rotating in a forward direction, that is, in a direction to indicate increase in the distance of travel, is indicated by the arrows in Fig. 8. It will be noted that when the disks rotate in this direction the lug 130 on the periphery of each disk 124 will pass under and lift a corresponding flat spring 131, said springs being secured in place by the screws 127 heretofore mentioned. This movement in the direction of the arrows also keeps the springs 128 tightly wound up on the hubs of the disks 124, continued rotation of the disks causing the outer end of these springs to be dragged forward into engagement with succeeding teeth in the opening in plate 126, as already explained. The pawls 118, by engaging the ratchet wheels 115, prevent the springs 128 from rotating the numeral disks in the reverse direction. Means are provided, however, whereby an individual using the device may release these pawls from engagement with their ratchet wheels, thus permitting the springs 128 to come into action to rotate the disks in the reverse direction. In this reverse rotation—which is opposite to the direction indicated by the arrows in Fig. 8—the lugs 130 finally come into contact with their corresponding spring stops 131, thereby arresting the reverse rotation of the disks when the latter come to their zero positions, the lugs 130 being so relatively positioned as to cause the numeral disks to be stopped in this position. Thus at the end of each trip, or at any desired intervals, the user of the device may return the numeral disks 113 to their zero or starting position. As a convenient means for permitting this to be accomplished, a plunger 132 having a milled head passes through an opening in the wall of the casing, and carries at its inner end a collar 133 adapted upon inward movement of the plunger to engage a depending arm 134 at one end of sliding plate 120, thereby imparting longitudinal movement to the latter and causing it in turn to move the pawls 118 to such position as to release their corresponding numeral disks to the action of springs 128. A flat spring 135 (Fig. 10) secured at one end to the inner surface of the casing, bears at its free end against the inner end of the plunger 132 and also against the inner edge of depending arm 134, moving both to the position shown in Fig. 10, when pressure of the plunger is released.

The mounting of the main shaft 35 in the casing, the connections for driving the same, and the tubular elbow and other parts on the casing through which said driving connections extend (shown particularly in Figs. 12, 13 and 14), will now be described.

In an opening through one side of the circular cup-like inclosing casing 20 there is secured a tubular connection 27 which is internally screw-threaded for engagement with the exterior thread of a ball-cup 28. An improved and economical way of securing connection 27 to the casing is illustrated particularly in Fig. 13; 27ª, 27ª are two projecting lips on connection 27, adapted to pass into the spaces 20ª 20ª between the ends of inwardly projecting lips 20ᵇ 20ᵇ of an opening through the side wall of the cup-casing, whereby when connection 27 is given a quarter of a rotation the lips 27ª will engage behind and bear upon the lips 20ᵇ 20ᵇ. Solder 20ᶜ (Fig. 12) is then preferably applied to prevent further relative rotation and the parts are thus securely and neatly locked together by what may be designated a bayonet-joint, or an interrupted screw-thread or breech-block connection. It will of course be understood that the contacting surfaces of the lips may one or both be inclined to have a cam action, so that the turning of the part 27 in the opening draws it firmly to its seat. Said cup is locked in any position to which it is adjusted by a nut 29 engaging an exterior thread thereon and adapted to be seated against the bottom of an annular recess in the outer end of the connection 27. The parts 30, 31, of a two-part ring (see Fig. 14) each have an inwardly projecting lip or flange 32 engaging a groove 33 (Fig. 12) which extends completely around the outer wall of the connection 27. Exterior screw threads on the parts of the two-part ring register at their ends when the parts of the ring are relatively positioned about the outer end of the connection 27, thereby permitting the interiorly screw threaded end of an elbow 34 to be screwed on to the two-part ring, holding the parts thereof together with their flanges 32 in locking engagement with the grooves 33. With the elbow turned down firmly against the main portion of the two-part ring the elbow is joined to the part 27, and the casing, by a swivel, which permits the elbow to be turned without disturbing the relative positioning and arrangement of the parts. The advantage of this connection will be apparent; with the elbow or other part joined to the casing simply by a screw thread connection, as has been customary heretofore, turning of the elbow caused the screw threaded connection to move the elbow farther toward or away from the casing. With a beveled gear shaft connection, such as herein illustrated, this interferes with the meshing of the gears. Other apparent advantages of the connection need not be herein detailed.

35 is the main or governor shaft of the device, coned or tapered at one end at 36 for engagement with antifriction balls 37 inclosed in a circular ball-cup 38 (Fig. 12); a stud 39 centrally positioned on the bottom of the cup is driven into a recess in the inner wall of the casing 20. A cap 40 fitting closely over the open end of the ball-cup with frictional engagement, retains the balls in place and is provided with a central opening through which the conical end of the shaft projects. It will thus be seen that at its left hand end (Fig. 12) the main shaft 35 is supported or journaled in a ball bearing. At its right hand end the shaft 35 has a tapered or frusto-conical shoulder 41, the smaller end of the shaft beyond this shoulder extending through a central opening in the ball-cup 28 and carrying a beveled gear 42 rotating in a chamber within the elbow 34. The conical shoulder 41 engages balls 43 within the cup 28, thereby forming a ball bearing for the right hand end of the shaft, Fig. 12.

44 is a tubular plug having a screw thread on its exterior adapted to engage an interior thread at the outer end of the elbow 34; a ring lock nut 45 secures the parts against turning when brought to proper relative position. A short shaft 46 rotatably mounted in the plug 44 carries fixed to its inner end, preferably formed integral therewith, a beveled gear 47 adapted to mesh with the beveled gear 42 heretofore mentioned.

48 is a washer interposed between the beveled gear 47 and the inner end of the plug 44.

The outer reduced end of the shaft 46 is formed with a laterally projecting lug 49, preferably formed integral with the shaft in reducing its end, and the end of the plug 44 is interiorly screw-threaded, these provisions being made for effecting connection with a flexible shaft and its inclosing sheathing in a manner which need not be described in detail herein. The flexible shaft is, in the case of a motor-vehicle, intended to extend to the gearing connections whereby it is to be rotated from one of the wheels of the vehicle.

What I claim is—

1. The combination of a numeral disk or wheel adapted to be rotated in a forward direction to give a desired indication; a spring exerting tension to rotate the disk in a rearward direction while permitting unlimited rotation of the disk in the forward direction, one end of said spring having fixed connection to the disk and the other end of said spring having an anchorage adapted to be shifted by the forward rotation of the disk; means for retaining the disk in any position to which it is moved by forward rotation thereof; means operable to release said retaining means thereby freeing the disk to be rotated in a rearward direction by said spring; and means for arresting the disk in a zero or starting position when thus rotated by the spring.

2. The combination of an indicator disk or wheel adapted to be rotated to give a desired indication, a spring exerting tension to rotate said disk to a zero or starting position, one end of said spring having fixed connection to the disk, fixed teeth with which the other end of said spring is adapted to make shifting engagement or anchorage, means for retaining the disk in any indicating position to which it is moved, a release device operable upon said retaining means thereby freeing said disk to the action of said spring, and means for arresting the disk in a zero or starting position when thus rotated by the spring.

3. The combination of an indicator disk or wheel adapted to be rotated to give a desired indication, a circular chamber, a coiled spring located in said circular chamber and exerting tension to rotate said disk to a zero or starting position, one end of said spring having fixed connection to the disk, teeth on the peripheral wall of the circular chamber with which the other end of said spring is adapted to make shifting engagement or anchorage, means for retaining the disk in any indicating position to which it is moved, a release device operable upon said retaining means thereby freeing said disk to the action of said spring, and means for arresting the disk in a zero or starting position when thus rotated by the spring.

4. The combination of an indicator disk or wheel adapted to be rotated to give a desired indication, a shaft to which said disk is fixed, a circular chamber, a coiled spring located in said circular chamber about the shaft and exerting tension to rotate said shaft to a zero or starting position, one end of said spring having fixed connection to the disk, teeth on the peripheral wall of the circular chamber with which the other end of said spring is adapted to make shifting engagement or anchorage, a second disk fixed on said shaft and covering said spring and its chamber, means for retaining the indicator disk in any indicating position to which it is moved, a release device operable upon said retaining means thereby freeing the indicator disk to the action of said spring, and means for arresting the indicator disk in a zero or starting position when thus rotated by the spring.

5. The combination of an indicator disk or wheel adapted to be rotated to give a desired indication, a shaft to which said disk is fixed, a circular chamber, a coiled spring located in said circular chamber about the shaft and exerting tension to rotate said shaft to a zero or starting position, one end of said spring having fixed connection to the disk, teeth on the peripheral wall of the circular chamber with which the other end of said spring is adapted to make shifting engagement or anchorage, a second disk fixed on said shaft and covering said spring and its chamber, means for retaining the indicator disk in any position to which it is moved, a release device operable upon said retaining means thereby freeing said disk to the action of said spring, and a stop cooperating with said second disk to arrest the indicator disk in a zero or starting position when thus rotated by the spring.

6. The combination of two or more indicator disks or wheels adapted to be rotated in a forward direction to give a desired indication, a spring exerting tension to rotate each disk in a rearward direction while permitting unlimited rotation of the disk in a forward direction, one end of each spring having fixed connection to its disk and the other end of each spring having anchorage adapted to be shifted by the forward rotation of its disk, a pivoted pawl for each disk, ratchet teeth with which each pawl cooperates to hold its corresponding disk against rotation by its spring and releasing means common to all of said pawls and adapted to be manually operated to swing the same on their pivots out of engagement with their ratchet teeth.

7. The combination of a numeral disk or wheel, means for rotating the same in a forward direction, a spring constantly exerting tension to rotate the disk in a rearward direction while permitting unlimited rotation of the disk in the forward direction, one end of said spring having fixed connection to the disk and the other end of said spring having a tooth, a circular series of fixed teeth with which said tooth on the spring is adapted to make shifting engagement, thereby constituting an anchorage adapted to be shifted by the forward rotation of the disk, means for retaining the disk in any position to which it is moved by forward rotation thereof, and means operable to release said retaining means thereby freeing the disk to be rotated in a rearward direction by said spring.

In testimony whereof I have signed this specification in the presence of two subscribing witnesses.

JOSEPH W. JONES.

Witnesses:
HENRY HOTTINGER,
W. L. BEARDSLEY.